(12) United States Patent
Cherry et al.

(10) Patent No.: US 9,092,634 B2
(45) Date of Patent: Jul. 28, 2015

(54) VEHICLE BATTERY DATA STORAGE AND ACCESS SYSTEM AND METHOD

(71) Applicant: Johnson Controls Technology Company, Holland, MI (US)

(72) Inventors: Kenneth B. Cherry, Lawrenceville, GA (US); Dale A. Gospodarek, Kenosha, WI (US)

(73) Assignee: Johnson Controls Technology Company, Holland, MI (US)

(*) Notice: Subject to any disclaimer, the term of this patent is extended or adjusted under 35 U.S.C. 154(b) by 0 days.

(21) Appl. No.: 14/055,546

(22) Filed: Oct. 16, 2013

(65) Prior Publication Data

US 2014/0123310 A1    May 1, 2014

Related U.S. Application Data

(60) Provisional application No. 61/720,285, filed on Oct. 30, 2012.

(51) Int. Cl.
*G06F 21/00* (2013.01)
*G06F 21/60* (2013.01)

(52) U.S. Cl.
CPC .................. *G06F 21/602* (2013.01)

(58) Field of Classification Search
USPC .......................................... 726/27
See application file for complete search history.

(56) References Cited

U.S. PATENT DOCUMENTS

| | | | |
|---|---|---|---|
| 7,498,767 B2 | 3/2009 | Brown et al. | |
| 7,750,639 B2 | 7/2010 | Quint et al. | |
| 8,299,757 B2 | 10/2012 | Yamaichi et al. | |
| 8,344,685 B2 | 1/2013 | Bertness et al. | |
| 2005/0201558 A1* | 9/2005 | Watanabe et al. | 380/211 |
| 2008/0306569 A1* | 12/2008 | Tobacman | 607/29 |
| 2009/0184801 A1* | 7/2009 | Bliding et al. | 340/5.61 |
| 2013/0062573 A1* | 3/2013 | Lin et al. | 252/506 |
| 2013/0305057 A1* | 11/2013 | Greco et al. | 713/189 |

FOREIGN PATENT DOCUMENTS

| | | |
|---|---|---|
| CN | 102096048 B | 6/2011 |
| CN | 102336176 A | 2/2012 |
| EP | 2149796 A | 2/2010 |

OTHER PUBLICATIONS

Predicting lithium-ion battery degradation for efficient design and management; Grolleau et al; EVS27 International battery, hybird and fuel cell electric vehicle symposium, May 12 ,2012; 6 pages.*

* cited by examiner

*Primary Examiner* — Jason Lee
(74) *Attorney, Agent, or Firm* — Fletcher Yoder, P.C.

(57) ABSTRACT

A storage battery comprises a data storage device that allows for storing and retrieving data that may be useful during the life of the battery. The device may include a radiofrequency tag applied to the surface of the battery. Data stored in the device may be accessed by various devices, such as battery analyzers that perform remaining life other analyses. Some or all of the data may be encrypted to require that approved or licensed devices only access and use the data. Some data may be encrypted in one manner, requiring a first key, and other data in a different manner, requiring a different key. The different data sets may have different purposes, such as for battery analysis (using no encryption or requiring the first key), and for warranty, manufacturing, retail tracking and other purposes (using the second key).

20 Claims, 2 Drawing Sheets

VEHICLE BATTERY DATA STORAGE AND ACCESS SYSTEM AND METHOD

CROSS REFERENCE TO RELATED APPLICATIONS

This application claims priority from and the benefit of U.S. Provisional Application Ser. No. 61/720,285, entitled "VEHICLE BATTERY DATA STORAGE AND ACCESS SYSTEM AND METHOD," filed Oct. 30, 2012, which is hereby incorporated by reference in its entirety for all purposes.

BACKGROUND

The present application relates generally to the field of batteries, and to analyzers for determining battery parameters, such as battery life. More particularly, the invention relates to novel techniques for storing on or in a battery itself and accessing data that aids in such battery analysis, as well as in other functions involving the battery.

A wide range of batteries have been developed and are currently in use for applications such a vehicle starting and propulsion. In motor vehicle, for example, batteries may be coupled to starters and other electrical devices that assist in the initial cranking of the vehicle engine. Other batteries are used continuously or intermittently during propulsion of the vehicles. Current battery technologies include conventional wet cell batteries, glass mat batteries, metal ion batteries, to mention only a few. An increasing variety of such technologies are underdevelopment and will doubtless come into use in the future.

Both for new and aged batteries it is sometimes desirable to analyze their electrical performance parameters as well as specific capacities, such as amp-hours and estimated remaining life. Volts and amps available for output power are easily tested by conventional multi-meters. Life testing may require specific algorithms, typically programmed into a battery analyzer. The analyzer can be coupled to terminals of the battery, and the algorithm run to provide an indication of the remaining battery life, typically presented as a percentage. One drawback with conventional battery analyzers is the possibility that certain information regarding the battery may be input wrongly. With wrong input values, the algorithm utilized by the analyzer may make erroneous calculations or assumptions, resulting in an erroneous estimation of the battery life. Similarly, certain information that can be stored on batteries to facilitate this process may be altered or subject to alteration (making it questionable, or accessed in a manner that is detrimental to either the analysis or to other functions of the data. While certain improvements have been proposed in the art, these are still not without drawbacks, particularly insomuch as the data may still be wrongly interpreted or wrongly accessed. There is a need, therefore, for improvement in such systems.

SUMMARY

The present invention provides a novel technique for storing and retrieving data on or in a battery designed to respond to such needs. In accordance with certain aspects of the invention, a storage battery comprises a data storage device mounted on or in a component of the battery. A dataset is stored on the data storage device and encrypted to limit access and use of the dataset to devices having a suitable decryption key.

In accordance with other aspects, a storage battery comprises a data storage device mounted on or in a component of the battery, a first dataset stored on the data storage device and accessible for use in a first manner, and a second dataset stored on the data storage device and accessible for use in a second manner different from the first manner.

In accordance with still further aspects, the invention may provide a battery analysis system that comprises a battery analyzer configured to access encrypted data from a data storage device mounted on or in a component of a storage battery, the data comprising data useful in performing analysis of the battery. A pair of conductors are configured to couple the battery analyzer to terminals of the storage battery.

DRAWINGS

DETAILED DESCRIPTION

Figure 1:
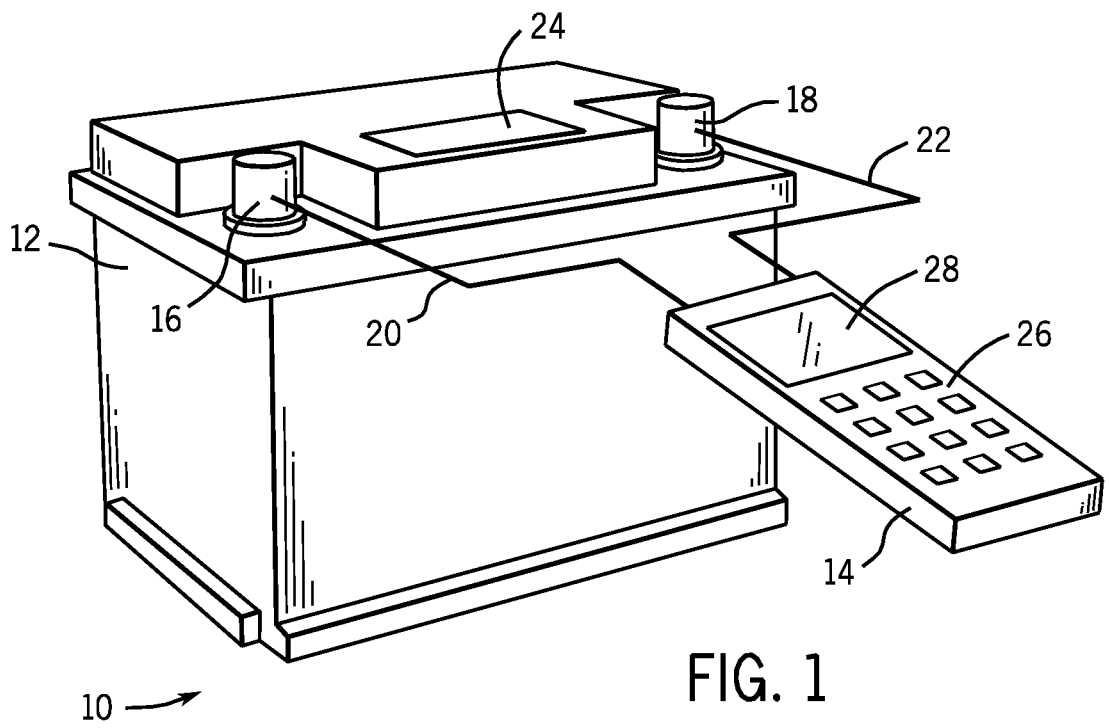
FIG. 1 is perspective view of an exemplary storage battery and analyzer in accordance with certain aspects of the present techniques.

Referring to the drawings, and first to FIG. 1, a battery data management system is illustrated and designated generally by reference numeral 10. The system includes a battery 12 that may be of any desired type or technology. Such batteries may be used to start and/or drive a vehicle, such as an automobile, motorcycle, boat, airplane, or any other suitable vehicle. More generally, however, the battery may be used for a range of applications that require power either continuously or intermittently, including commercial, residential and industrial applications, alternative energy generation and/or storage systems, and so forth. Similarly, the battery may make use of any storage technology, and the present disclosure is not intended to be limited to any particular battery technology, battery type or format, or to any particular battery application.

Also shown in FIG. 1 is a portable battery analyzer 14. The analyzer may be of a conventional type, but is equipped to draw information from a storage device on or in the battery as described below. The analyzer may make use of one or more analysis algorithms, and may measure, for example, battery voltage, available current, storage capacity, remaining battery life, and so forth. The particular algorithms utilized in the analysis are generally known and are beyond the scope of the present disclosure. The analyzer would typically be coupled to terminals 16 and 18 of the battery by conductors 20 and 22. Although not illustrated in FIG. 1, the conductors may be equipped with hand-operated clamps that permit the conductors to be temporarily secured to the terminals and removed after analysis of the battery parameters.

The system shown in FIG. 10 allows for the analyzer 14 to draw data from a data storage device as indicated by reference numeral 24. In a presently contemplated embodiment, the data storage device includes a radio-frequency (RF) tag that may be an active or passive device. As will be appreciated by those skilled in the art, such tags may store a range of data which may be encoded in any useful form. In the presently contemplated embodiment, the radio-frequency (RF) tag may allow for the storage of up to 160 bits of data, although more or less storage may be used. Moreover, in this embodiment the storage device is a passive device that is excited by a field emitted by the analyze 14. The analyzer thus includes a user interface 26 and a display 28. The user interface allows a user to select one or more functions, input data, and more generally manipulate the operation of the analyzer, while the display 28 allows for data to be read out by the user, as well as instructions, parameters, and so forth. Internal to the analyze, then, is a radio-frequency reader (not separately represented) that is capable of exciting the data storage device and retrieving data from the data storage device in response to the excitation signal. The analyze may be a special-purpose device, such as current analyzers made uniquely for this purpose, or in certain embodiments it may be incorporated into other hand-held devices, such as laptop computers, tablet computers, hand-held devices, smart phones, and so forth.

Figure 2:
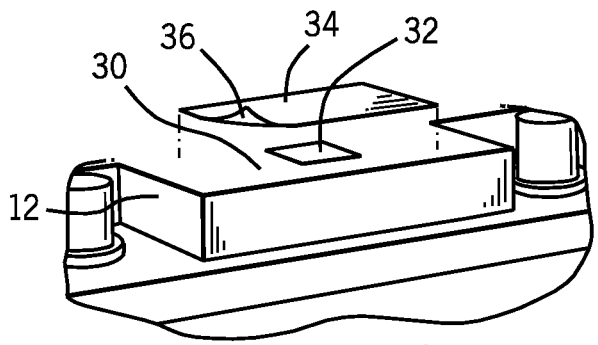
FIG. 2 is a partial perspective view of the battery of FIG. 1 with a data storage device ready to be installed.

FIG. 2 illustrates exemplary data storage device that may be used with a battery of the type described above. In this embodiment, a top surface 30 of the battery serves as the support for a "label sandwich" that comprises an RF tag or device 32 and a label 34 that covers the device. A lower surface 36 of the label may be provided with an adhesive such that, when the label is applied to the surface of the battery, surrounds and covers the data storage device and seals to the surface 30 of the battery. It should be noted that such label sandwiches may be prefabricated with upper and lower sheet-like members that encapsulate and contain the data storage device, with the entire label, then, being capable of adhesive mounting to the battery. It should also be noted that such devices may be placed on any suitable surface of the battery, such as the top or any side. In certain embodiments, moreover, the devices may be contained within the battery, embedding into a component of the battery (e.g., part of the battery shell) or disposed in any suitable manner that still allows access to the data.

As will be appreciated by those skilled in the art, the RF tag or device 32 will typically include a data storage chip and an antenna coupled to the chip for storing and outputting data when the antenna is excited. Active devices may similarly have a storage chip and antenna, but may also have a power source, such as a small battery. Data desired to be stored on the storage device is encoded and loaded on the device during any suitable phase of the battery life such as during manufacturing, commissioning, installation, servicing and so forth. However, in a presently contemplated embodiment, critical items of data useful for analyzing battery life, tracking battery information and so forth are stored initially on the data storage device at the time the battery is initially manufactured or shipped, and may be subject to little or no alteration thereafter. Similarly, as described below, certain of the information may be accessed in one manner (e.g., without encryption of with a first encryption), with other data being accessed in other manners (e.g., encrypted or with a second encryption). In such cases, the data may not be subject to access or use without proper decryption, or certain of this data may then be accessed and available (for use and/or modification), while other data is not.

Figure 3:
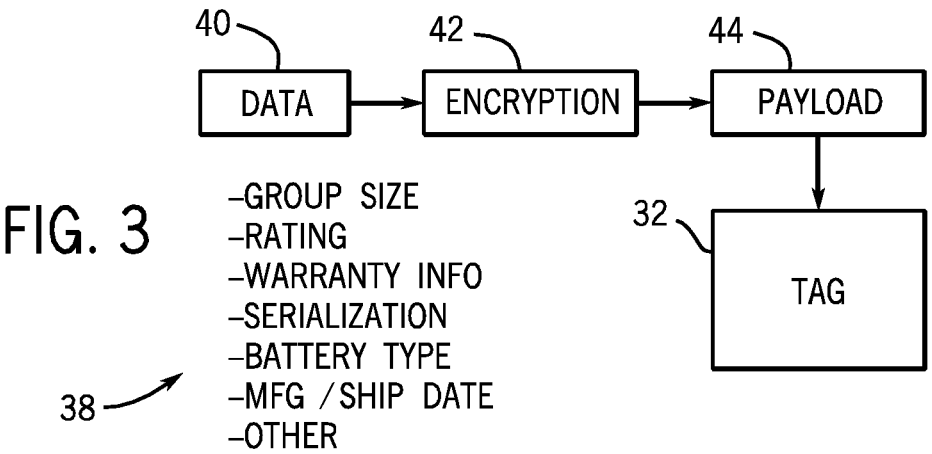
FIG. 3 is a diagrammatical representation of the storage of certain battery-related information on a storage device that is disposed on or in a battery.

FIG. 3 illustrates diagrammatically one presently contemplated technique for storing certain data on such storage devices. The data to be stored on the device, as indicated generally by reference numeral 38, may include such information as the battery group size, the rating, any applicable warranty information, serialization information, the battery type, manufacturing and shipping information, or any other useful information that may be used or tracked during the battery life. Such data will typically be defined prior to or during manufacture. The data is encoded in any suitable manner and forms a dataset as generally indicated by reference numeral 40. In a presently contemplated embodiment, then, this data is encrypted as indicated by block 42. Any suitable encryption technique may be utilized.

Moreover, in a presently contemplated embodiment more than one different groups of data or files may be provided and these may be encrypted in different manners, that is, to require different decryption keys. For example, one set of data may be encrypted for use with the first key and may include information that can be accessed readily by an analyzer for use in an analysis algorithm as described above. Such information may include, for example, group size, rating, battery type, and so forth. Other data may be encrypted differently or for use with a different decryption key, and may include data that is not needed by the analyzer or that is desired to be kept from access, such as warranty information, serialization information, manufacturing and shipping information, original equipment manufacturer data, retail outlet product numbers, and so forth. The encrypted (and/or unencrypted) information then forms a payload 44 which is loaded onto the tag 32 for association with the individual battery as described above.

It should be noted that several advantages may flow from the encryption described above. For example, certain information that is subject to ready access, whether it is encrypted in a first manner or not encrypted at all, may be useful for analyzers and other purposes, such as for diagnosing battery issues, servicing of the battery, and so forth. Other data that may be encrypted in a second manner (or, where the first data is not encrypted at all, the second data may simply be encrypted), may be reserved for use by particular manufacturers, warranty providers, retail outlets, original equipment manufacturers, and so forth. When a battery is analyzed, then, the first set of data may be readily accessible or the decryption key may be licensed to an analyzer manufacturer or supplier, or, for example, to a chain of service or maintenance providers for use in battery evaluation. However, again, the data payload may include other information which is not licensed or accessible, or is subject to a different license, such as where proprietary or sensitive data is used by a battery manufacturer, retail outlet, original equipment manufacturer, or the like for analysis of products and sales, product failures and issues, warranty claims, and so forth.

Figure 4:
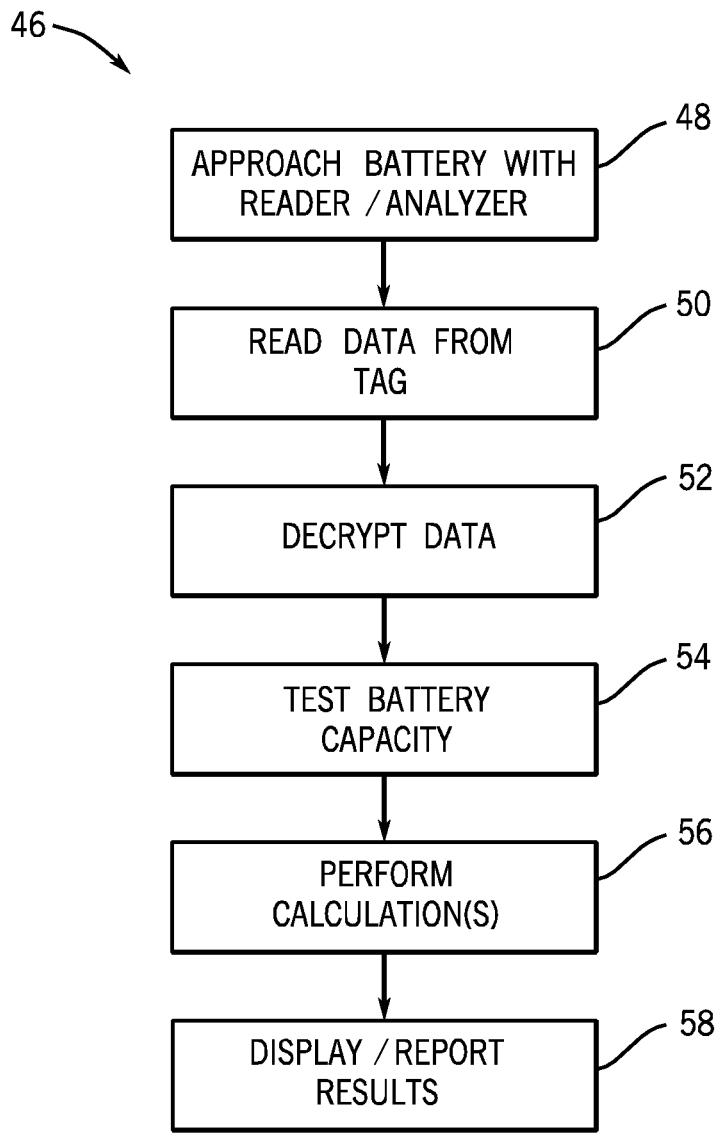
FIG. 4 is a flow chart illustrating certain logic in the storage and retrieval of data in such a system.

FIG. 4 illustrates exemplary logic for performing analysis of a battery by accessing data from a tag of the type described above. The process 46 begins with approaching or attaching the battery to a reader/analyzer as indicated at step 48. Data from the data storage device, such as an RF tag is then read from the tag as indicated by step 50. Based upon a decryption key accessed by or stored within the reader/analyzer, then, the data is decrypted as indicated at step 52. Here again, this may or may not be all of the data stored in the storage device, and any unavailable or uninterpretable data is not used by the analyzer. Depending upon the algorithm employed by the analyzer, then, one or multiple measurements may be made, such as testing of the battery capacity as indicated by step 54. In many cases this may be performed based in part on data gathered by the physical connections made to the battery terminals. Equipped with this information and data read and decrypted from the data storage device, then, one or more calculations may be performed as indicated at step 56. As noted above, these calculations may be made in accordance with any suitable presently known or later developed analysis algorithms, including conventional algorithms presently used by such analyzers. However, the reading and decryption of data from the data storage device may alleviate the need for human input of the data, thereby avoiding errors.

Moreover, the reading and decryption of the data used in the calculations may allow for certified or authorized analyzers only to operate on the data storage in the storage device, allowing for control of the data and the analysis process, both for proprietary and quality reasons. Finally, at step 58 results of the test may be displayed and results may be reported in a conventional manner. Where desired, these results may be displayed directly on the display of the analyzer discussed above, or results may be stored externally from the analyzer, such as in a database or other memory structure. Where desired, certain of the tags may be designed to allow for storage of certain of these results directly on the storage device, and where provided, this option may include encryption of the data stored on the storage device.

While not separately illustrated, other data stored in the data storage device may be accessed and decrypted by other readers and devices for other purposes. For example, battery identification information, warranty information, manufacturing information, retail product numbers and the like may be accessed separately and differently (e.g., decrypted with a different key) as needed to track a particular battery, to determine whether warranties exist and are in force, to determine whether a particular battery was actually purchased from a particular outlet, and so forth. Again, this information may be made unavailable for other purposes, such as the battery analysis described above.

While only certain features and embodiments of the invention have been illustrated and described, many modifications and changes may occur to those skilled in the art (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A storage battery, comprising:
   a radiofrequency tag mounted on or in a component of the storage battery, wherein the radiofrequency tag comprises:
   a first dataset comprising information associated with a sale or a manufacture of the storage battery, wherein the storage battery is configured to assist in one or more operations of a vehicle, and wherein the first dataset is encrypted with a first encryption key; and
   a second dataset comprising information associated with the storage battery, wherein the second dataset is different from the first dataset, wherein the second dataset is encrypted with a second encryption key that is different than the first encryption key.

2. The storage battery of claim 1, wherein the radiofrequency tag is a passive device excited by a field from a device accessing the dataset.

3. The storage battery of claim 1, wherein the radiofrequency tag forms part of a label sandwich.

4. A storage battery, comprising:
   a radiofrequency tag mounted on or in a component of the storage battery configured to assist in one or more operations of a vehicle, wherein the radiofrequency tag comprises:
   a first dataset comprising information associated with the storage battery, wherein the first dataset is encrypted with a first encryption key; and
   a second dataset comprising information stored at a time at which the storage battery is manufactured or shipped, wherein the second dataset is encrypted with a second encryption key that is different than the first encryption key.

5. The storage battery of claim 4, wherein the first dataset comprises a group size, a rating, a type, remaining life determination, or any combination thereof, associated with the storage battery.

6. The storage battery of claim 4, wherein the second dataset comprises manufacturing and/or shipment data, warranty data, original equipment manufacturer data, retail sale data, serialization information, or any combination thereof, associated with the storage battery.

7. The storage battery of claim 4, wherein the storage battery is configured for starting or propulsion of a vehicle.

8. A battery analysis system, comprising:
   a battery analyzer configured to access a first dataset from a radiofrequency tag mounted on or in a component of a storage battery configured to assist in one or more operations of a vehicle, wherein the first dataset is encrypted with a first encryption key and comprises sale or manufacture information associated with the storage battery, wherein the radiofrequency tag stores a second dataset that is encrypted with a second encryption key that is different from the first encryption key; and
   a pair of conductors configured to couple the battery analyzer to terminals of the storage battery.

9. The system of claim 8, wherein the first dataset is useful in performing battery life analysis.

10. The system of claim 8, wherein the analyzer comprises a user interface and a screen for display of analysis results.

11. A storage battery, comprising:
    a radiofrequency tag configured to be mounted on a component of the storage battery, wherein the storage battery is configured to assist in one or more operations of a vehicle, and wherein the radiofrequency tag comprises:
    a first dataset encrypted with a first encryption key, wherein the first dataset comprises manufacturing and/or shipment data, warranty data, original equipment manufacturer data, retail sale data, serialization information, or any combination thereof, associated with the storage battery; and
    a second dataset encrypted with a second encryption key that is different from the first encryption key, wherein the second dataset comprises a group size, a rating, a type, remaining life determination, or any combination thereof, associated with the storage battery.

12. The radiofrequency tag of claim 11, wherein the radiofrequency tag is a passive device excited by a field from a device accessing the dataset.

13. The storage battery of claim 1, wherein the second dataset comprises group size, rating, type, or remaining life determination, or any combination thereof, associated with the storage battery.

14. The storage battery of claim 1, wherein the first dataset comprises manufacturing and/or shipment data, warranty data, original equipment manufacturer data, retail sale data, or serialization information, or any combination thereof, associated with the storage battery.

15. The system of claim 8, wherein the first dataset comprises group size, rating, type, or remaining life determination, or any combination thereof, associated with the storage battery.

16. The storage battery of claim 8, wherein the second dataset comprises manufacturing and/or shipment data, warranty data, original equipment manufacturer data, retail sale data, or serialization information, or any combination thereof, associated with the storage battery.

17. The storage battery of claim 4, wherein the radiofrequency tag is a passive device excited by a field from a device accessing the dataset.

18. The storage battery of claim 1, wherein the storage battery is configured for starting or propulsion of a vehicle.

19. The system of claim 8, wherein the radiofrequency tag is a passive device excited by a field from a device accessing the dataset.

20. The storage battery of claim 11, wherein the storage battery is configured for starting or propulsion of a vehicle.

* * * * *